United States Patent [19]

Vicari et al.

[11] 4,210,783
[45] Jul. 1, 1980

[54] DIGITALLY CONTROLLED TELEPHONE ANSWERING SWITCHING SYSTEM

[75] Inventors: Ronald P. Vicari, Elmwood Park, N.J.; Barry Yampol, Oyster Bay, N.Y.

[73] Assignee: Graphic Scanning Corp., Englewood, N.J.

[21] Appl. No.: 733,357

[22] Filed: Oct. 18, 1976

Related U.S. Application Data

[60] Division of Ser. No. 591,233, Jun. 27, 1975, Pat. No. 3,987,252, which is a continuation-in-part of Ser. No. 392,634, Aug. 29, 1973, abandoned.

[51] Int. Cl.² ............................................. H04Q 3/60
[52] U.S. Cl. ........................... 179/18 FC; 179/27 FH
[58] Field of Search ........... 179/27 FH, 27 FF, 27 D, 179/18 B, 18 BE, 18 AH, 18 AG, 18 AD, 18 ES, 18 FC

[56] References Cited

U.S. PATENT DOCUMENTS

| | | | |
|---|---|---|---|
| 3,002,054 | 9/1961 | Krom | 179/27 FH |
| 3,253,089 | 5/1966 | Breen et al. | 179/27 FH |
| 3,341,663 | 9/1967 | DeStefano | 179/27 FH |
| 3,485,957 | 12/1969 | Pearce | 179/18 BE |
| 3,504,129 | 3/1970 | Ewin et al. | 179/18 AG |
| 3,542,961 | 11/1970 | Klein et al. | 179/18 BE |
| 3,614,328 | 10/1971 | McNaughton et al. | 179/15 AT |
| 3,624,307 | 11/1971 | Sikorsky et al. | 179/27 FF |
| 3,632,889 | 1/1972 | Sikorsky et al. | 179/27 FF |
| 3,637,947 | 1/1972 | Breen | 179/27 FH |
| 3,643,034 | 2/1972 | Burns et al. | 179/27 D |
| 3,721,770 | 3/1973 | Beidel et al. | 179/27 D |
| 3,733,440 | 5/1973 | Sipes | 179/18 B |
| 3,809,823 | 5/1974 | Jacobs et al. | 179/27 D |
| 3,816,665 | 6/1974 | Russell et al. | 179/18 AD |
| 3,890,473 | 6/1975 | Warman et al. | 179/27 DB |

OTHER PUBLICATIONS

*Telephone Answering System*, by R. A. Kolpek, IBM Technical Disclosure Bulletin, vol. 17, No. 3, Aug. 1974.
"Meeting Business Needs With the No. 2BACD," Morse, *Bell Laboratories Record*, vol. 53, No. 4, Apr. 1975, pp. 181-188.
"Telephone Answering Services," Watson & Weinberg, *Bell Laboratories Record*, vol. 43, No. 11, Dec. 1965, pp. 447-450.

*Primary Examiner*—Thomas W. Brown
*Attorney, Agent, or Firm*—S. C. Yuter

[57] ABSTRACT

A computer controlled telephone answering system is disclosed which can economically and efficiently serve a large number of subscribers over a vast geographic area. The system utilizes a plurality of remote sites each of which is adjacent to a telephone company central office and which includes a trunk concentrator invention to reduce the number of trunk lines required to service the subscribers. A central site of this answering system serves as a facility to answer calls relayed through the remote sites. It also includes a trunk concentrator invention to further reduce the number of trunk lines to operator positions. A computer at the central site controls the entire system, determines switching paths from a subscriber line to an operator, furnishes answering information to operators and stores instructions for answering incoming messages. The logic of the system permits any operator to answer any incoming telephone call on any subscriber line promptly, economically and correctly. The trunk concentrator invention includes a bidirectional analog switching means for interconnecting any one of a plurality of incoming trunk lines to any one of a lesser number of outgoing trunk lines. It also includes means for testing for a ringing subscriber line and transmitting the subscriber's identity to the central office.

2 Claims, 12 Drawing Figures

TELEPHONE ANSWERING SERVICE
REMOTE SITE EQUIPMENT

SYSTEM BLOCK DIAGRAM
TELEPHONE ANSWERING SERVICE

OPERATOR POSITION BLOCK DIAGRAM
WITH STAND ALONE CRT'S

TELEPHONE ANSWERING SYSTEM
CENTRAL SITE CONCENTRATOR

RING MUX 4,210,783

DIGITALLY CONTROLLED TELEPHONE ANSWERING SWITCHING SYSTEM

This application is a division of prior application Ser. No. 591,233 filed on June 27, 1975, now U.S. Pat. No. 3,987,252 issued Oct. 19, 1976, in turn a continuation-in-part of Ser. No. 392,634 filed Aug. 29, 1973 and abandoned after the filing of Ser. No. 591,233.

BACKGROUND OF THE INVENTION

1. Field of the Invention

This invention pertains to a computer-controlled telephone answering system, and more particularly, to a digitally controlled trunk line concentrator system. The analog switches in matrix form which enable the telephone answering system, under computer control, to connect an available free path from the input side of each sequential analog switching matrix to the output side and eventually to a computer terminal of the operator who will answer the call.

The system of the present invention is designed to operate in a computer-controlled telephone answering system serving subscribers over a wide geographic area and linked to numerous telephone company central offices. It includes a remote site concentrator which reduces the number of trunk lines necessary to connect subscriber telephones to a central answering service office and includes special purpose digital logic for switching control, command verification, ring detection and data communications to and from the central answering service office, thus functioning as a remote site special purpose computer; a central site concentrator which further reduces the number of trunks required for connections within the central answering service center to operator positions in a non-blocking manner; a central computer for control of the system and storage of messages; and an operator console including a computer terminal for operator answering of individual calls processed by the system.

2. Description of the Prior Art

Telephone answering systems are well known in the prior art and need not be described specifically here.

The prior art does disclose, however, a number of switching systems for minimizing the number of trunk lines required between a telephone company central office and the switchboard of a telephone answering service. U.S. Pat. No. 3,002,054, as an example, discloses a trunk concentrator for telephone answering service for installation and operation in a telephone company central office which enables a reduction in the number of trunks required to connect each subscriber line to a remote telephone answering service. It is uncertain, however, what level of reduction occurs within such a system and whether the concentrator can be economically utilized in large scale answering systems covering a wide geographic region and numerous telephone company central offices. It also appears that this system requires a conventional switchboard and conventional operator positions, a limitation not necessitated in the system of the present invention.

The system of the present invention is based upon a number of statistical factors observed in the study of telephone answering systems. A telephone answering service has a relatively large number of subscribers whose telephone lines are connected to the answering service lines at a telephone company central office. For every 512 subscriber lines so connected, only a small percentage will be in use at any one time. For every 512 subscriber lines served by a telephone answering service, statistics indicate that only eight of said lines are active at peak times, and as few as none to two are active in non-peak times. However, in a conventional system, there must be positions on an answering service switchboard for all 512 lines. With some effort, an operator can reach to the boards at either side of her position to cover another 100 or 200 lines, if she is not busy. Present telephone answering systems, however, provide no way to direct an incoming call on a given subscriber line to any operator position which is not busy. These calls must be directed to the operator position on the specific switchboard to which the subscriber's line is connected, regardless of the current workload of the operator. This results in a considerable lack of flexibility and unnecessary operating costs for a telephone answering service.

The system of the present invention is designed to minimize the number of trunks required to service the subscribers of a telephone answering service through the use of at least two trunk concentrators which are under the control of a computer. The first type of trunk concentrator, of which there may be more than one, is located at a remote site, preferably adjacent to a telephone company central office serving individual subscribers. For each 512 subscriber lines coming into each remote site, from a single telephone company central office, there is an analog switching matrix which will switch any one of the 512 incoming lines to any one of eight outgoing trunks which transmit signals to the answering service central location. Each remote site also has the equivalent of a special purpose, control mini-computer to control and verify the operation of the analog switching matrices, a memory to hold temporarily command messages for forwarding to the central location of the answering service, and digital logic for ring detection, switch control and message verification.

Each remote site of the answering service is connected to a central site at which the calls are actually answered by operators. For every 128 trunks reaching the central site, there are up to sixty-four operator positions, each of which is able to answer any one of the 128 trunks coming into the central site. To accomplish this, a central site concentrator is utilized which is a 128 by 64 analog switching matrix under the control of a central site computer. Each operator position is basically a computer input-output terminal with a keyboard, a cathode ray tube (CRT) display, and a memory and control unit. The central site computer, in addition to a control program for the entire system, also contains within its memory the pertinent information required by an operator to answer each incoming call. As the computer recognizes a call to be answered, it determines by the table look-up, which operator position is free to answer the call and sends the pertinent answering information to the operator terminal to which it will direct the call. After the operator receives the call and takes the caller's message, the operator will key the incoming message into the computer where it will be stored until the subscriber calls for his messages. In this fashion, the system minimizes the chance of operator error in answering calls, in taking messages, and in giving messages to the subscriber. It also maximizes the use of operator labor by providing a computer based retrieval system rather than a manual retrieval system.

The present embodiment of the system, as described herein, accomodates up to 1,024 subscriber lines at each remote site, which lines are concentrated to as many as sixteen trunk lines going to the central site. Each central site can handle as many as 128 trunk lines from various remote sites, thus eight remote sites serving a total of 8,192 subscriber lines, as illustrated in the drawings; any one of which subscriber lines can be answered at any operator terminal; a flexibility which is impossible to achieve in any other telephone answering system. The number of remote sites is limited by the 128 inputs to the central control concentrators.

SUMMARY OF THE INVENTION

This invention pertains to a digitally controlled trunk concentrator system which, through the use of a series of trunk concentrators, is able to service a large number of subscribers over a wide geographic area, while minimizing the number of trunk lines and operators required to service these subscribers. The system includes trunk concentrators located at remote sites, preferably adjacent to telephone company central offices, and at a central site housing operators who answer calls, and a computer which controls the system.

Each remote site serves as an entry point for the subscriber lines from a nearby telephone company central office. At the remote sites these subscriber lines enter through a standard telephone company device access arrangement. The output from this equipment then is wired to the analog switching matrix of a remote site trunk concentrator. Each remote site concentrator is capable of concentrating 512 incoming subscriber lines down to a maximum eight outgoing trunk lines to a central answering service site. The remote site also contains the computer control and memory equipment necessary to operate its trunk concentrator, determine which lines should be answered and service the connection of subscriber lines to outgoing trunks to the central site. When a subscriber line is to be answered under computer control, a path through this matrix is determined and the active line exits from the matrix through one of a maximum of eight trunks to the central site.

The central site serves as the actual answering point in the system. It receives incoming calls from the remote sites and, by means of a second concentrator, switches any incoming call on one of 128 trunk lines, to any available operator position of the sixty-four provided under computer control. The computer at the central site also stores the relevent information required by operators to answer each call. Each operator at the central site is equiped with a computer terminal having a keyboard entry system and a CRT display. When the computer determines a free path from a ringing line to an operator position, it makes the necessary connections and forwards to the operator's display all the information which the operator requires to answer the call. While answering the call the operator keys in the incoming message and verifies it on her CRT screen. After completion of the call, the operator forwards the incoming message to the central computer and is free to receive another call. The flexibility of the system of the present invention is such that, in a typical installation, any one of 8,192 subscriber lines can be answered by any one of sixty-four operators with each call being answered correctly and unhurriedly.

The flexibility of the system is due in large part to the trunk concentrator invention. The remote site concentrators utilize 512 bidirectional eight-to-one analog switches, each of which will allow any one of eight signals to pass through it in either direction. A three level digital code is used to select the signal. Sixty-four analog switches are connected to select any one signal from 512 possible signals. Eight such 512-to-one matrices are put together to form a 512-to-8 matrix for the remote site concentrator. More than one such matrix may be used at any one site. An available free path through the matrix is determined under computer control. The trunk concentrator permits the number of trunks going to the central site to be reduced from 512 to eight or less for each remote site. An incoming call on any one of the 512 lines into a remote site concentrator can be forwarded to the central site on any one of the non-active trunks, which cannot be more than eight.

Another central concentrator is located at the central site. In a typical configuration, each central site concentrator has 128 trunks coming in from remote sites. In some cases a small portion of these 128 trunks will be used for outgoing calls. The central site concentrator directs each incoming call on any one of the 128 trunks to any one of sixty-four operator positions which may be free to answer the call. Thus the central site concentrator has an analog switching matrix of 128 by 64. Basically it utilizes the same eight-to-one bidirectional analog switch, arrayed differently. Sixteen eight-to-one switches form a 128-to-1 switch. Sixty-four of these 128-to-1 sections are put together to form a 128-to-64 analog switch.

The flexibility and economic feasibility of the system of the present invention is further enhanced by the use of single wire switching in the analog matrices of the concentrators. Each incoming subscriber line has two wires. In the concentrators, one of these wires is connected to a common ground. The other wire is connected to one of the eight-to-one bidirectional analog switches, and serves to carry the audio signals. The use of this single wire switching reduces the number of switches required in the system by one-half.

In sum, the present invention permits in the preferred embodiment any one of 8,192 subscriber lines coming from a plurality of telephone company central offices to be answered correctly and promptly by any one of up to sixty-four operators at a central answering service location.

The telephone answering system incorporating the present invention has other applications besides the traditional telephone answering service. For example, it may be used as a private branch exchange serving a large office or company and, through its concentrators, it need not be physically located in the office it serves. It may also be used as a telephone order system for a mass merchandising company receiving incoming orders from a vast geographic area at one central location.

It is, therefore, the principal object of this invention to provide an improved telephone trunk line concentrator for use by telephone answering services or others who receive a large volume of incoming calls.

It is a further object of this invention to provide an improved trunk concentrator analog switching system for use with a telephone answering system.

It is a further object of this invention to provide a new and improved trunk concentrator analog switching system for minimizing the number of trunk lines required to answer a finite number of subscriber telephones, thereby reducing the trunk costs of a telephone answering service.

It is a further object of this invention to provide an improved telephone answering service switching system which eliminates the necessity of providing a separate pair of wires for each subscriber between the location of the answering service center (where the operators are stationed) and the near vicinity of each subscriber's central office line connection.

It is a further object of this invention to provide a telephone trunk line concentrator which enables any incoming call to appear at any operator position and be answered correctly and promptly.

It is still a further object of this invention to provide a computer-controlled concentrator for use in a telephone answering system in which connections between an incoming call and the answering operator are achieved by means of a computer-controlled analog switching system.

Further objects, features and advantages of the present invention will become readily apparent from reading the accompanying detailed specification which will be written with reference to examples of embodiments shown in the attached drawings.

DESCRIPTION OF THE PREFERRED EMBODIMENT

Figure 1:
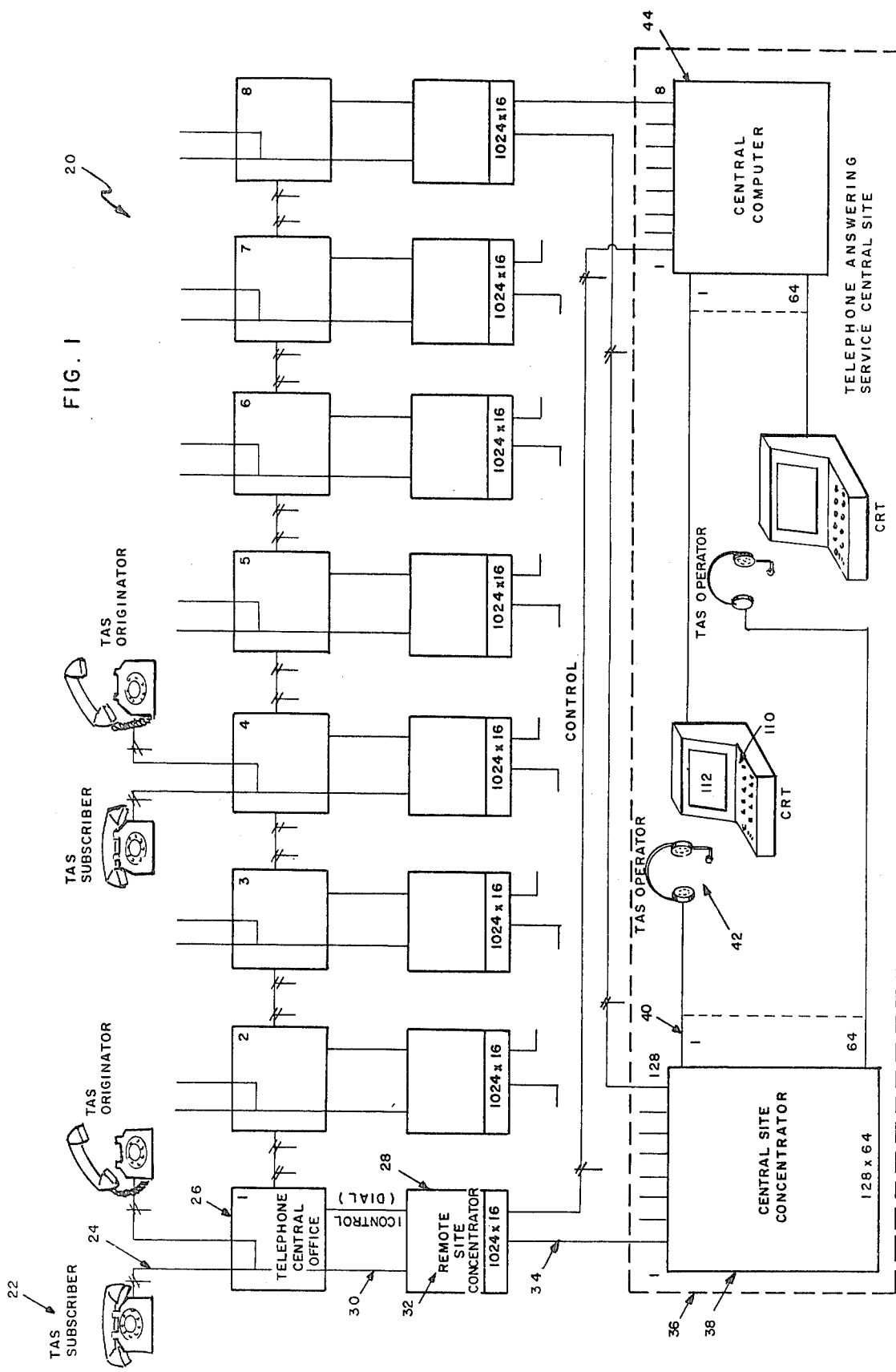
FIG. 1 is a schematic illustration in block diagram form of the computer-controlled telephone answering system incorporating the present concentrator invention and illustrating the interrelationship of the major subsystems.

Referring now to the drawings, and in particular to FIG. 1, wherein like reference numerals refer to like components, the computer-controlled telephone answering system, designated generally by the reference numeral 20, is illustrated diagramatically with a preferred embodiment of the present invention. The invention described herein is more particularly concerned with the analog switching and control systems required to handle incoming calls delivered to a telephone answering service over telephone company lines through standard telephone company equipment. All telephones are connected through switching circuits in one or more telephone company central offices. Subscribers to a telephone answering service are connected to the answering service by the extension of a pair of wires from the subscriber's position on the telephone office frame to a device access arrangement provided by the telephone company at the location of the answering service. In the present state of the art, a telephone answering service must serve only one or more colocated telephone company central offices to be economically feasible and avoid the high cost of trunk lines.

The telephone answering system 20 overcomes this economic limitation through the means described hereinafter. As illustrated in FIG. 1, the system 20 serves telephone answering service subscribers 22 whose telephone lines 24 are connected normally to a telephone company central office 26. When a subscriber 22 desires to be connected to a conventional telephone answering service, a second pair of wires is connected from the telephone company central office to the office of the answering service. Depending on applicable tariffs, which vary from community to community, the subscriber may be liable for a mileage charge for a trunk line to the answering service. System 20, to minimize such possible trunk line costs, includes one or more remote sites 28, each of which is located in near proximity to a telephone company central office 26. Each subscriber 22 is connected to remote site unit 28 through a trunk line 30, running from the central office 26 to the remote site unit 28. In the preferred embodiment, illustrated in the drawings, 1,024 subscribers 22 are connected to each remote site unit 28 by separate trunk lines 30. Within each remote site unit these 1,024 trunk lines 30 are concentrated by a remote site concentrator 32, as hereinafter described, down to sixteen or less trunk lines 34 which lead to a telephone answering service central site 36. In the preferred embodiment illustrated in the drawings, the central site 36 serves eight remote site units 28. Hence, 128 trunk lines 34 enter the central site, where they are then concentrated in a central site concentrator 38, as hereinafter described, to sixty-four lines 40 linked to operator positions 42 under the control of a central computer 44. Central computer 44 serves to control system 20 by determining analog switching paths through the analog matrices of the remote site concentrators 32 and the central site concentrator 38 to operator positions 42, and supplying from its memory answering information to operator positions 42 and storing messages accepted at operator positions 42 for later delivery to subscribers 22. The individual units, subsystems and operation of computer controlled telephone answering system 20 will be disclosed in detail in the succeeding sections of this specification.

Figure 2:
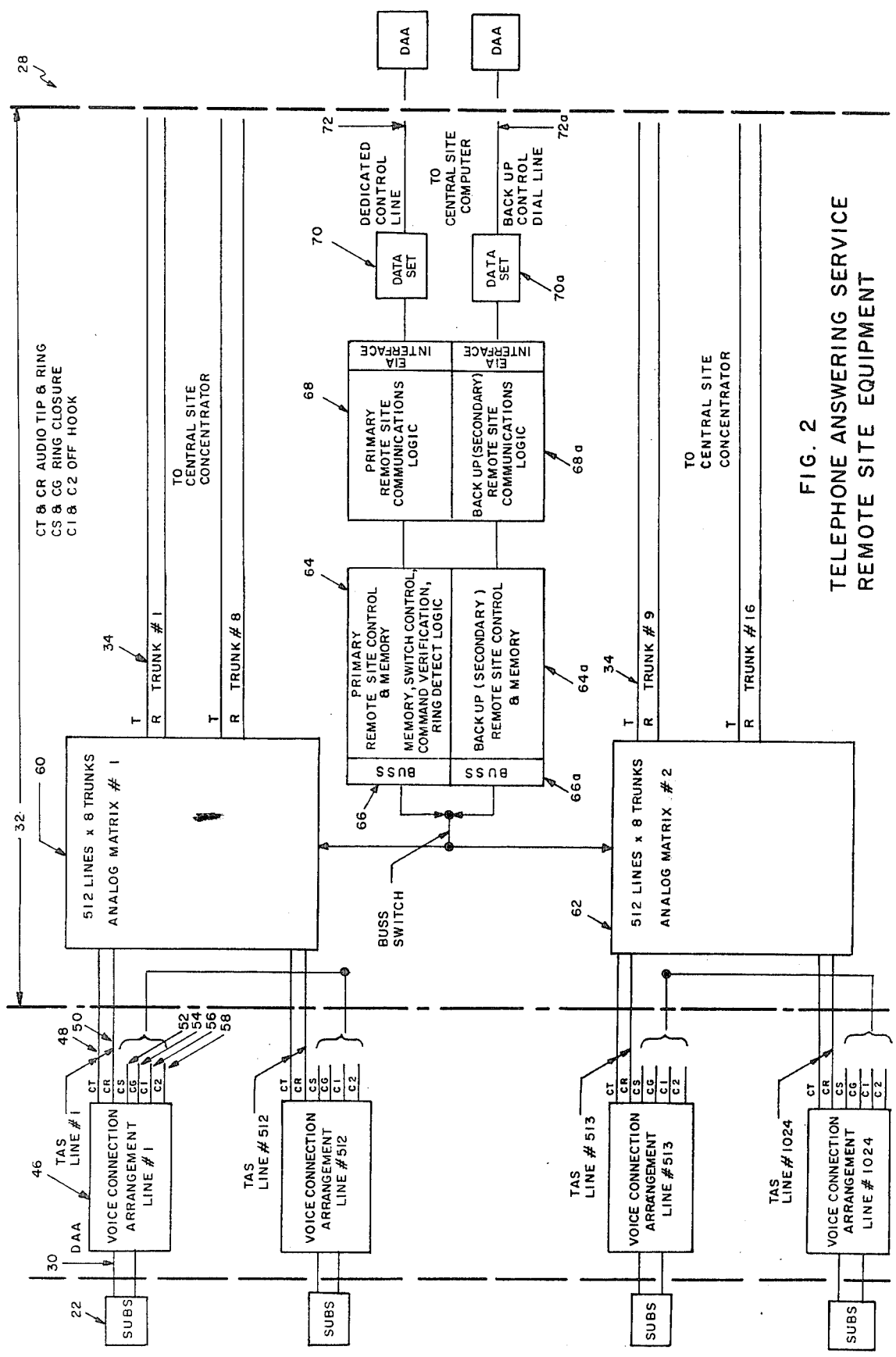
FIG. 2 is a block diagram illustrating the physical equipment at a remote site of the computer-controlled telephone answering system of FIG. 1 and the interrelationship of the major component units of the preferred embodiment of the concentrator.

Referring now to FIG. 2, wherein there is illustrated a block diagram of the physical equipment located in a remote site unit 28 of telephone answering system 20, the subscriber lines 30 enter the remote site unit 28 through a standard telephone company device access arrangement equipment 46, such as a CD-6 voice connection or equivalent. All wires 48 through 58 are connected to terminals located within the remote site unit 28 as described hereinafter. The remote site unit 28 includes, in the embodiment illustrated in the drawings, a remote site concentrator 32 consisting of two analog switching matrices 60, 62, each of which can accept up to 512 subscriber lines 30 which it switches into up to eights outgoing trunk lines 34, in such a way that any one of the 512 subscriber lines 30 may be switched into any one of the eight outgoing trunks 34 to the central site 36. The remote site unit 28 also includes a remote site digital control and memory unit 64 which stores and retrieves digital messages pertaining to switch control command verification and ring detection, connected to the analog matrices by a bus switch 66. The remote site unit 28 also includes communications logic 68 to control digital data transfers to and from the central site computer 44 through a data set 70 over a dedicated trunk line 72. All the digital control units in the remote site concentrator are duplicated by secondary systems 64a through 72a in the event of failure of the primary system. The back-up trunk line 72a is an automatic dial line which is switched in automatically upon detection of a failure in the primary system. The sixteen outgoing trunk lines 34 from analog switching matrices 60, 62 go directly to the central site concentrator 38. The equipment in a remote site unit 28 can fit into two standard cabinets of about forty-five cubic feet each and requires no personel for its operation. Hence the remote site unit 28 can be conveniently located adjacent to a telephone company central office 26 and through its 512-to-8 reduction in trunk lines, it can significantly reduce the cost of connecting subscriber lines 24 to an answering service central site 36.

Figure 3:
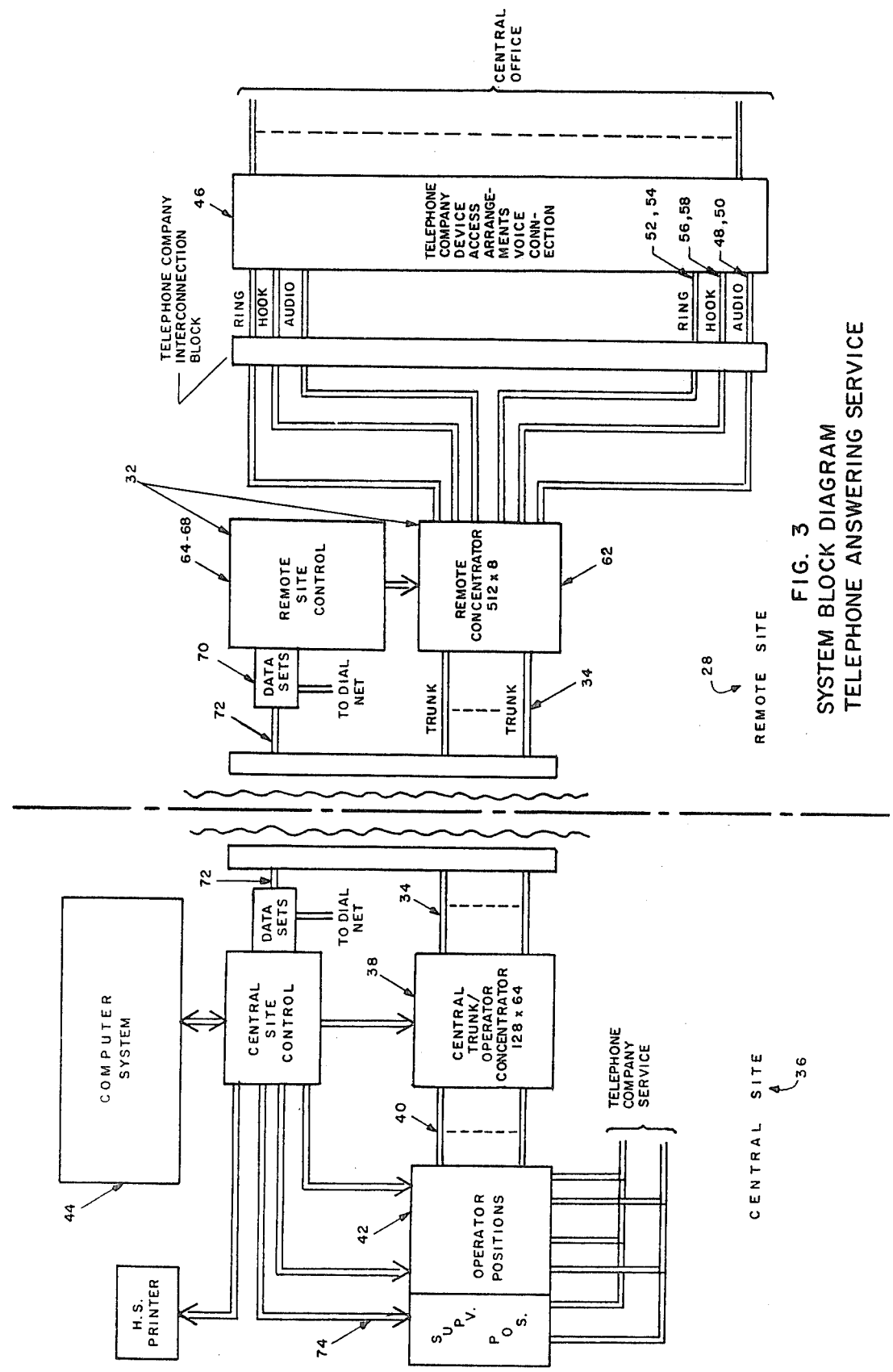
FIG. 3 is a block diagram illustrating the system trunk connections between a remote site and the central site of the system of FIG. 1.

FIG. 3 illustrates in block diagram form the telephone line connections within both the remote site unit 28 and the central site 36.

Figure 4:
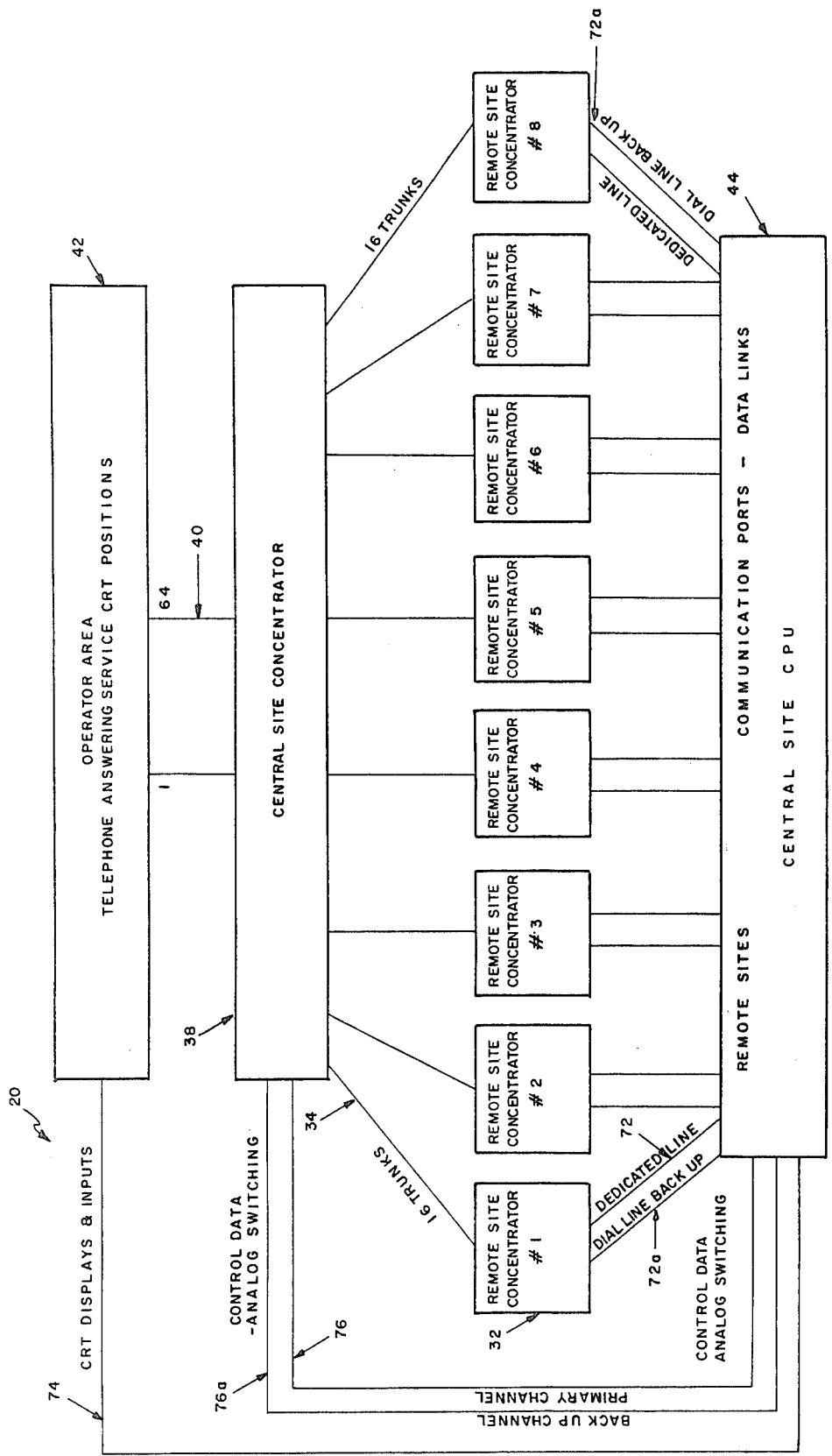
FIG. 4 is a functional block diagram illustrating the communication links between the operator positions and the other subsystems of the system of FIG. 1.

FIG. 4 illustrates the system 20 communication interfaces in a functional block diagram. System 20 is basically under the control of a central computer 44 located at the central site 36. Digital control messages are sent to the remote site control unit 64, commonly referred to as the remote site concentrator 32 hereinafter, over dedicated trunk lines 72. Remote site concentractors 32 each have up to sixteen trunks 34 delivering telephone calls to the central site concentrator 38, which functions electronically in a similar fashion to remote site concentrator 32 insofar as the analog switching matrices 60, 62 are concerned. After the control unit 64 of the remote site concentrator 32 has determined that a subscriber line 24, 30 is ringing and has rung the number of times stored in the ring memory, the remote site control unit 64 sends a digital message to the central site computer 44 to that effect. The computer 44, by a table look-up, determines a free path through the remote concentrator 32, a trunk line 34 to central site concentrator 38 and through central site concentrator 38 to a CRT line 40 to an available operator position 42. After the central computer 44 determines such paths, it issues digital data messages to the remote site control unit 66 via control line 72 and the central site concentrator 38 via control line 76 to set switches to enable the ringing subscriber line 24, 30 to be switched to an available operator position 42. These control messages from the central computer 44 to the remote control unit 66 and to the central concentrator are sent over the digital data lines 72 and 76 respectively. At the same time the central computer 44 notifies the operator position 42 via control line 74 which is to receive the incoming call that the call will be switched to that particular position, and furthermore the central computer 44 wil send to the operator position 42 from its memory identifying information such as the subscriber's name, telephone number, i.e., what line is to be answered, and answering instructions. This information is forwarded digitally to the operator position 42 over a control line to a controller 114 (illustrated in FIG. 7) and then to the CRT 112 (FIG. 1). When the operator is ready to answer the call, the operator signals the computer 44 by a function key on her keyboard 110. Open receipt of this digital message, the computer sends a switching command to the remote concentrator 32 through the remote site control unit 64. The connection through to the operator is made and the operator answers the call. As the operator receives from the caller incoming information to be retained and later forwarded to the subscriber, she keys this information into the controller 114 following a format on the CRT 112. The keyed-in information also appears on the CRT 112 for review and correction by the operator. After the call is completed and the operator has verified the message she signals the computer 44 and controller 114 to receive and send the message. The computer 44 then, on a time available basis, asks the controller 114 for the message. The operator, meanwhile, is available to receive another call.

Figure 5:
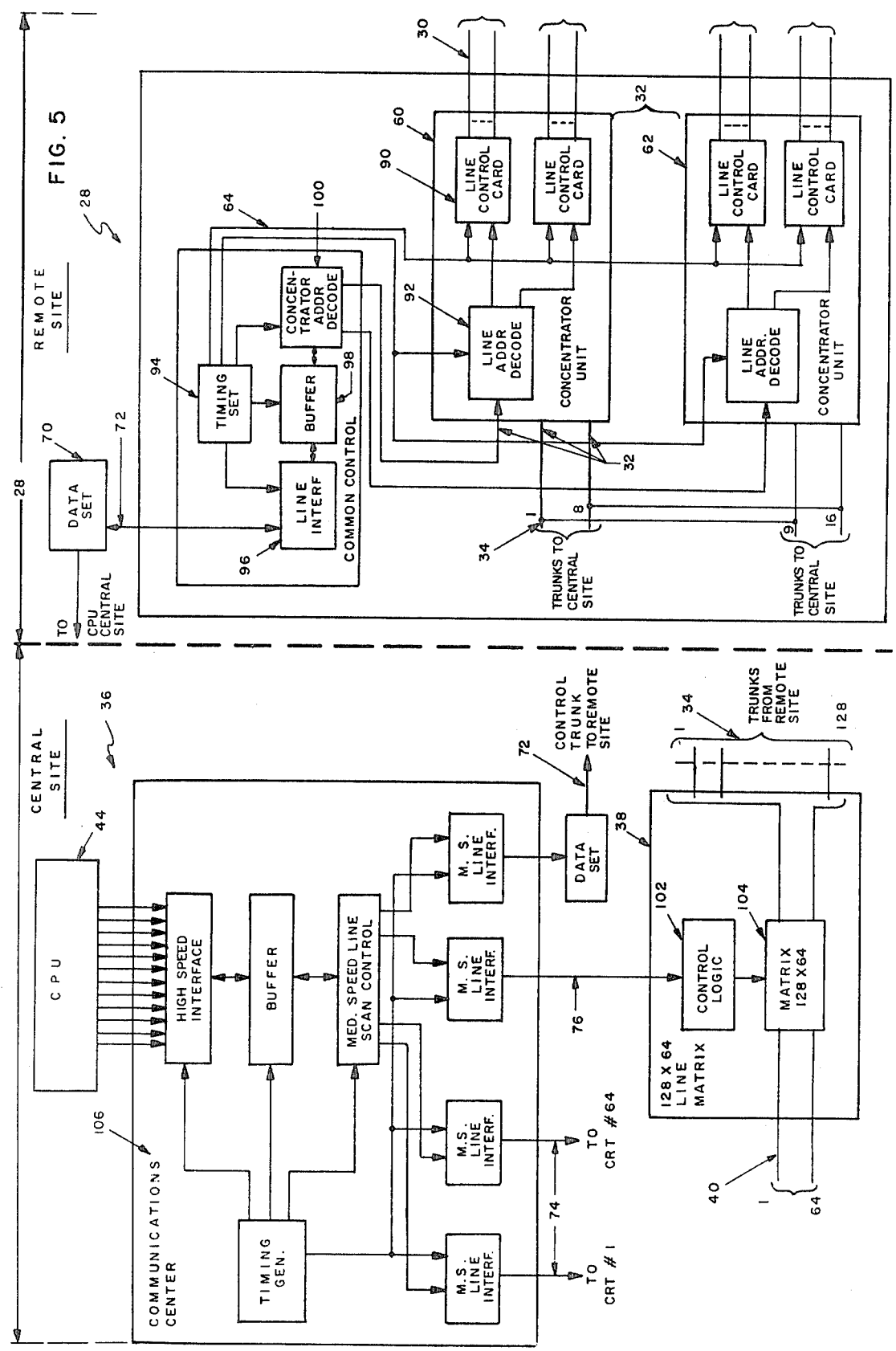
FIG. 5 is a functional block diagram illustrating the system control units at the remote and the central sites in the system of FIG. 1.

FIG. 5 illustrates in block diagram form the functional logic in the remote site unit 28 and central site 36. The remote site unit 28, in this embodiment, includes subscriber lines 30 entering the analog matrices 60,62 of the remote site concentrator 32 on line control cards 90 (illustrated in detail in FIGS. 11, 12 and 13). The line address decode 92 is also on these cards. Trunk lines 34 to the central site concentrator exit from line control cards 90. The control logic 64, 68 includes a timing set 94, a line interface 96, a buffer memory 98 and a concentrator address decode 100. A data set 70 serves as a communications link between the remote site unit 28 and the central site 36.

The central site control logic is contained in three functional units. The central site concentrator 38 functions in a manner similar to the remote site concentrator 32 insofar as its control logic 102 and its analog matrix 104 is connected. The central site computer 44, of course has its own logic. The central site communications center 106 controls all the data transfers within the system.

Figure 6:
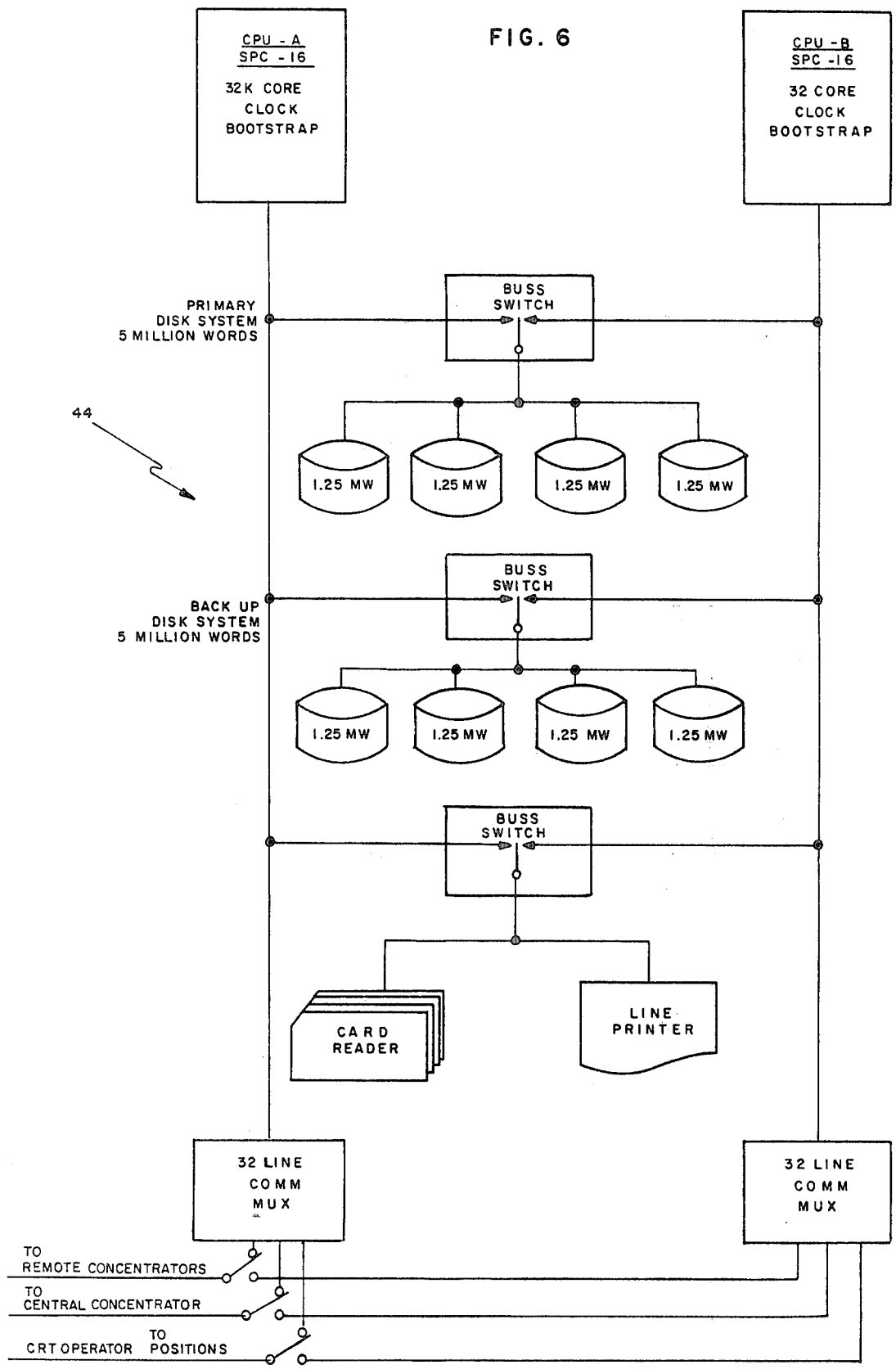
FIGS. 6 and 7 are block diagrams of the central site computer system of the system of FIG. 1 and the interfaces to the operator terminal units.

FIG. 6 illustrates the configuration of the central site computer system 44. The principal feature of computer 44 is the vast memory capacity for storing the subscriber information required to be sent to the operator positions 42 so that any operator can answer any call. Additionally, the computer 44 must store all incoming messages for subscribers taken by the operators until they are called for by the subscribers.

Figure 7:
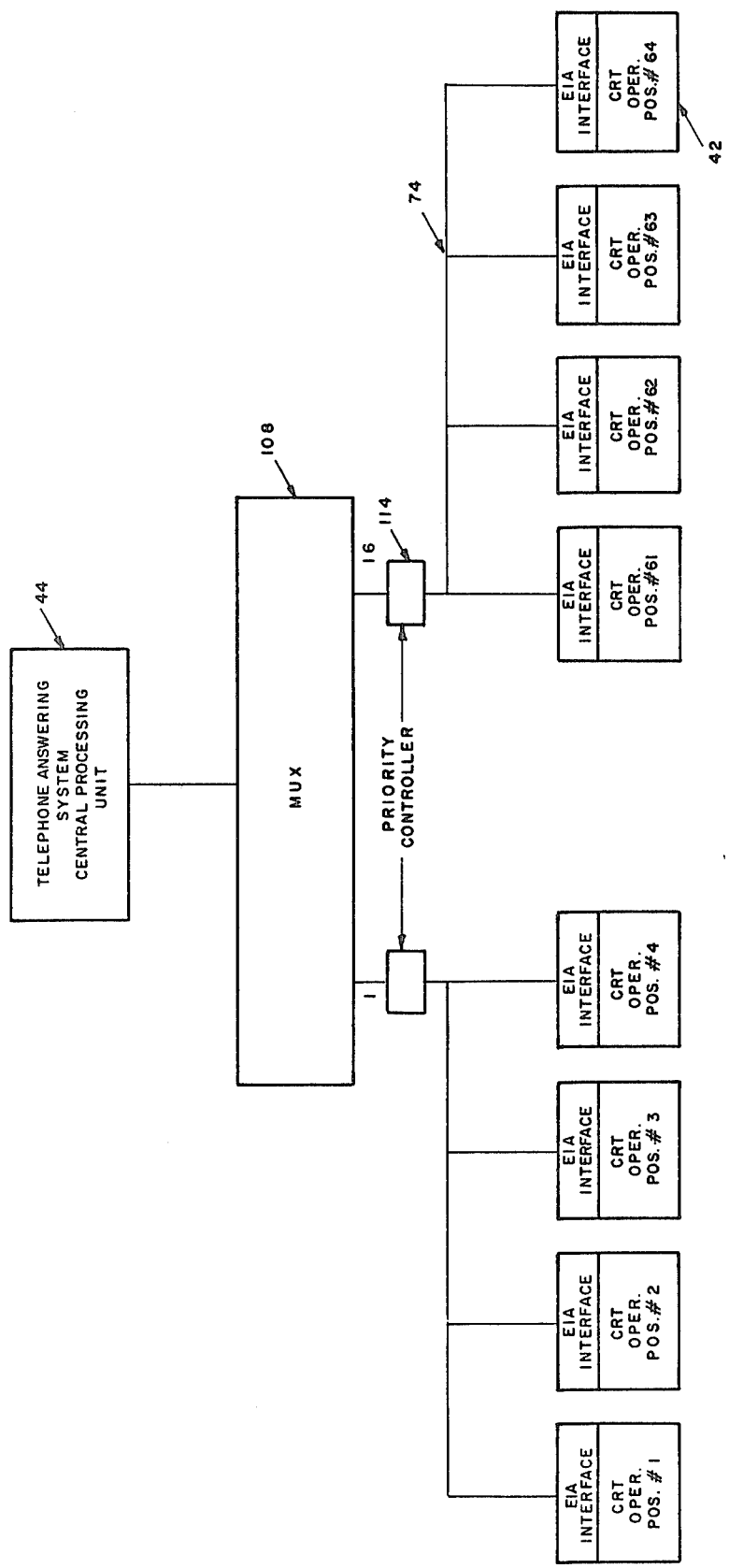

FIG. 7 illustrates in block diagram form, the relationship of the operator positions 42 to the central processor 44. Positions 42 are interfaced through multiplexer 108, four to a channel. Each operator position contains a keyboard 110, a CRT 112 and a telephone head set. Each group of four operator positions is served by one or more controller units 114 which refresh the CRT screens 112 and serve as buffer memory. Each controller 114 is connected directly to the multiplexer 108.

Figure 8:
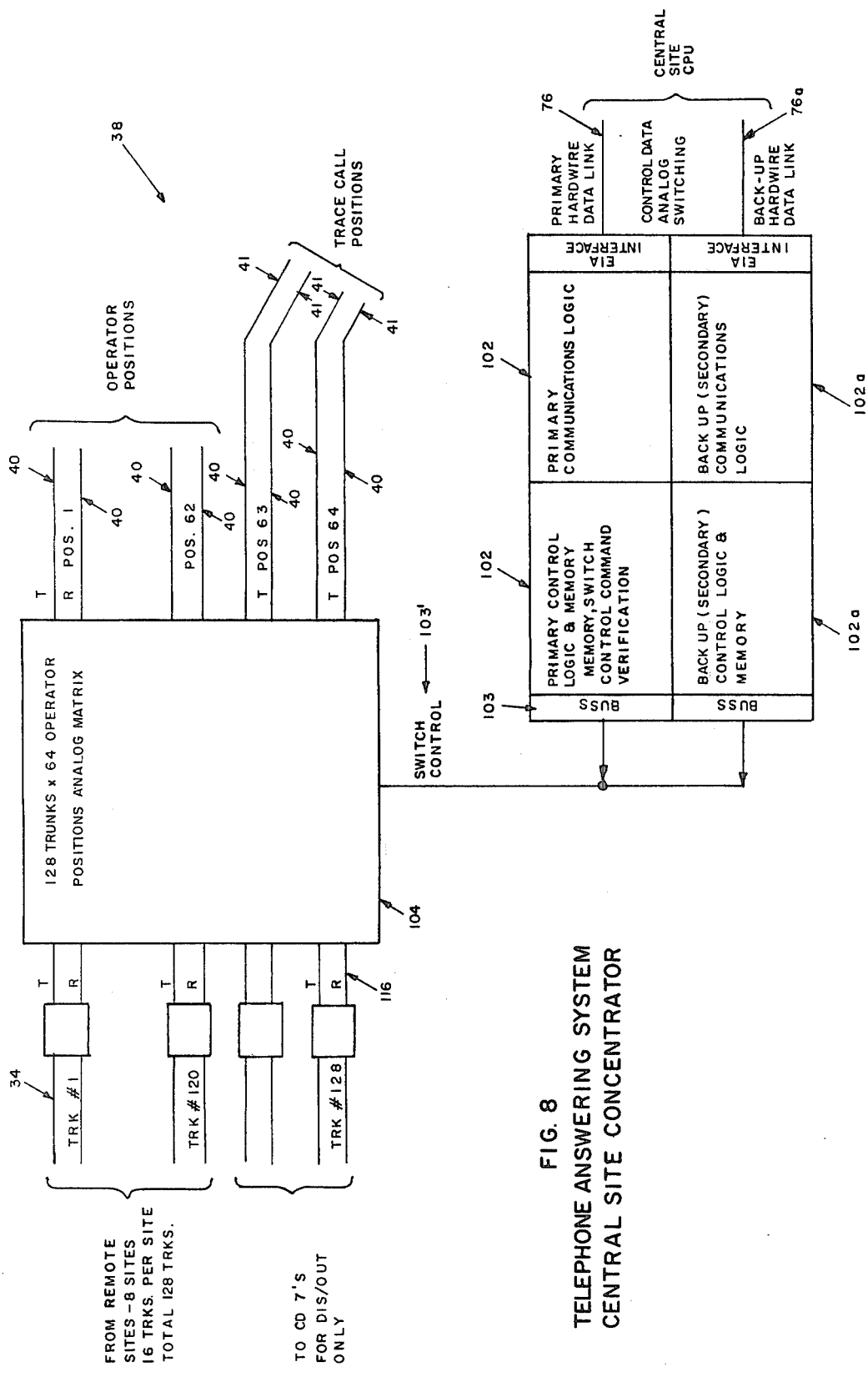
FIG. 8 is a functional block diagram of the central site concentrator of the system of FIG. 1.

FIG. 8 illustrates in detail the functional configuration of the central site concentrator 38. Central site concentrator 38 includes an analog switching matrix 104 which, in the embodiment illustrated in the drawings, is a 128-by-64 matrix. Matrix 104 further concentrates the trunk lines 34 from the remote site concentrators 32 to up to sixty-four lines 40 to the operator positions 42. The number of operator positions 42 and lines 40 to operator positions can vary according to the volume of calls received into system 20. Some lines 41 exiting from matrix 104 can be used for trace calls, the number varying according to the volume of such calls. The control logic 102 for central site concentrator 38 is similar to that for the remote site unit 28 except for the ring detection logic which is not in the central site concentrator 38. Central site concentrator control logic 102 has a bus switch 103 and is connected to computer 44 over data line 76. It also has a back-up logic 102a and a back-up dial line 76a. Since the central site 36 is manned by human operators, some configurations may reserve up to sixteen of the trunk lines 34, at least one per remote concentrator 32, hereinafter referred to by the reference numeral 116, for outgoing calls originated by the operators. Lines 116 would have an automatic dial feature and exit from the central site concentrator 38 through standard telephone company CD-7 equipment or equivalent.

Figure 9:
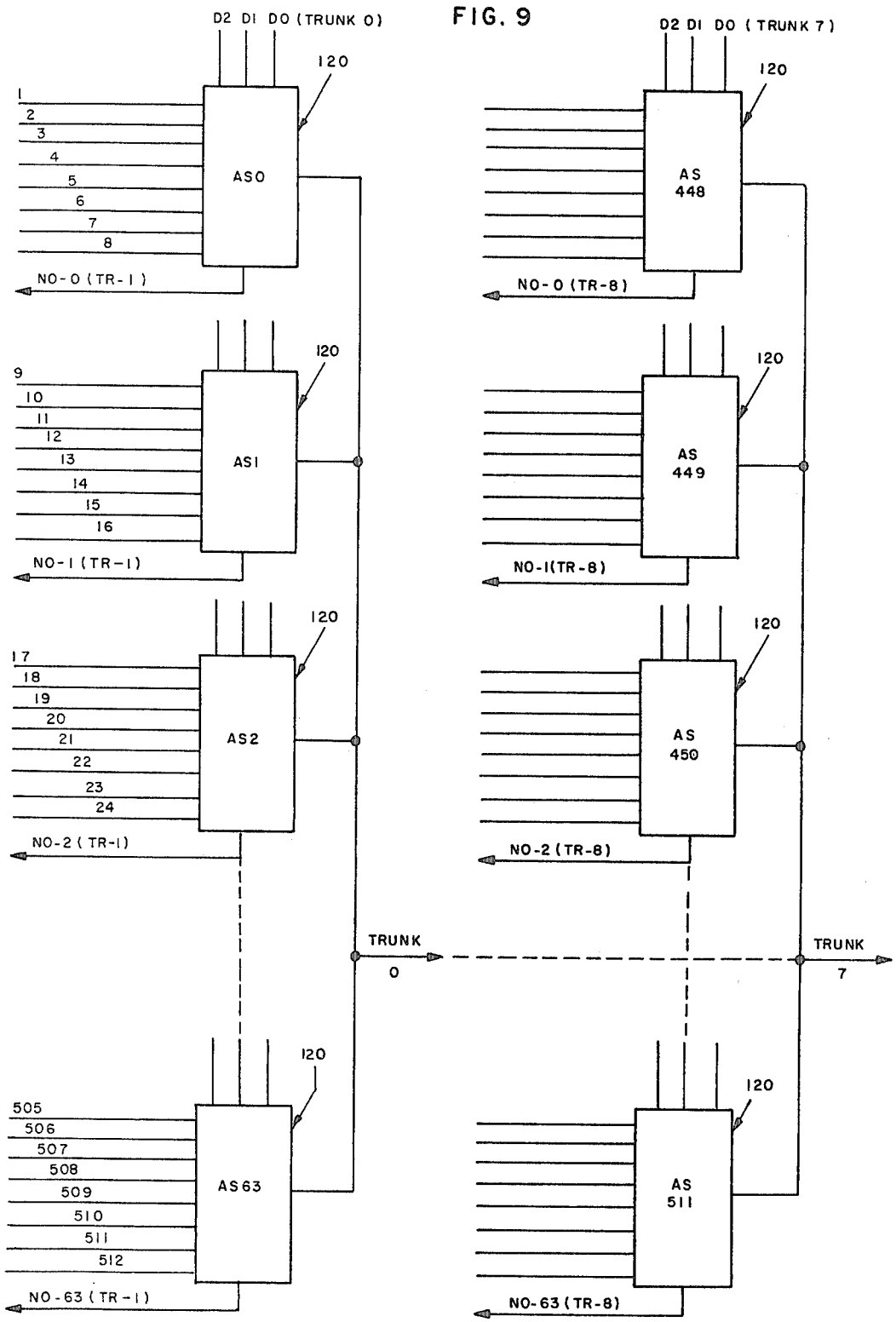
FIG. 9 is a schematic illustration of the analog switch as utilized in the remote site concentrators of the system of FIG. 1.

FIG. 9 illustrates the use of an eight-to-one bidirectional switch 120 in the analog matrices 60 and 62 of the remote site concentrator 32. Analog switch 120 is a commercially AM3075 eight-channel MOS analog multiplexer. Each analog matrix 60, 62 is a five hundred twelve-to-eight bidirectional analog switch built from five hundred and twelve individual analog switches 120. Each eight-to-one analog switch 120 will allow any one of eight signals to pass through it in either direction. The signal is selected by a three bit digital code. Each switch 120 also has an enable pin which permits the utilization of a large number of such switches 120 to form the analog matrices 60, 62 of the remote concentrator 32 and the analog matrix 104 of the central site concentrator 38. FIG. 9 illustrates in a fragmentary view how sixty-four of said analog switches 120 are connected to select any one signal from five hundred twelve lines. Also illustrated in FIG. 9 is the use of eight of these five hundred twelve-to-one sections to form each five hundred twelve-to-eight analog switching matrix 60, 62 in the remote site concentrator 32.

The analog matrix 104 of central site concentrator 38 can switch any one of one hundred twenty-eight lines 34 into any one of sixty-four lines 40 to the operator positions 42. It uses the same analog switching technique and analog switches 120 as the remote site concentrator 32 arrayed to form its 128-to-64 matrix. Each section will have one hundred twenty-eight eight-to-one analog switches 120 forming a 128-to-8 switch. Eight such sections are required, thus utilizing 1,024 switches 120 in the complete matrix 104.

Figure 10:
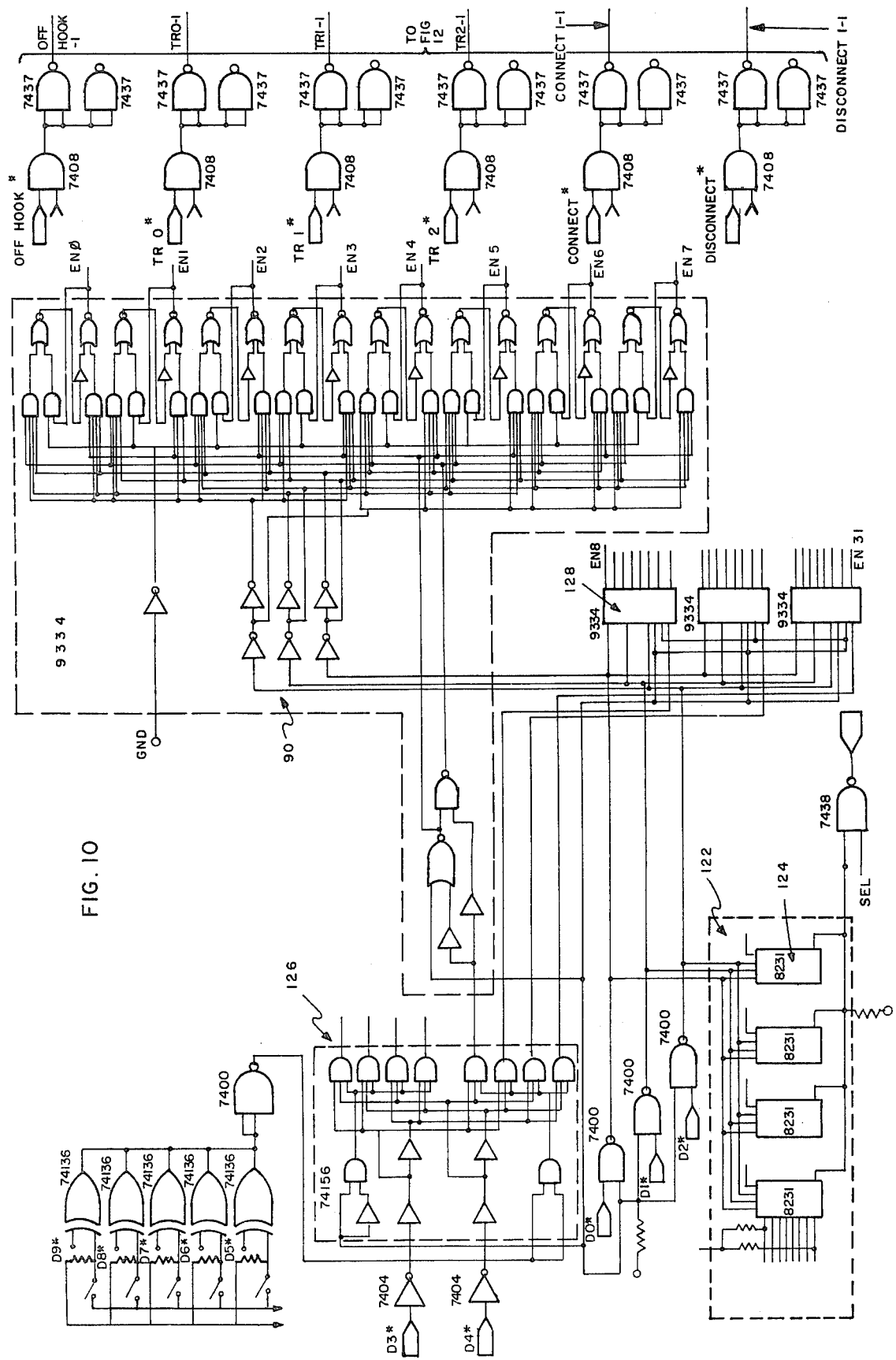
FIG. 10 is a schematic drawing of the control circuit on a line control card serving thirty-two subscriber lines entering the remote concentrator of FIG. 1.
Figure 11:
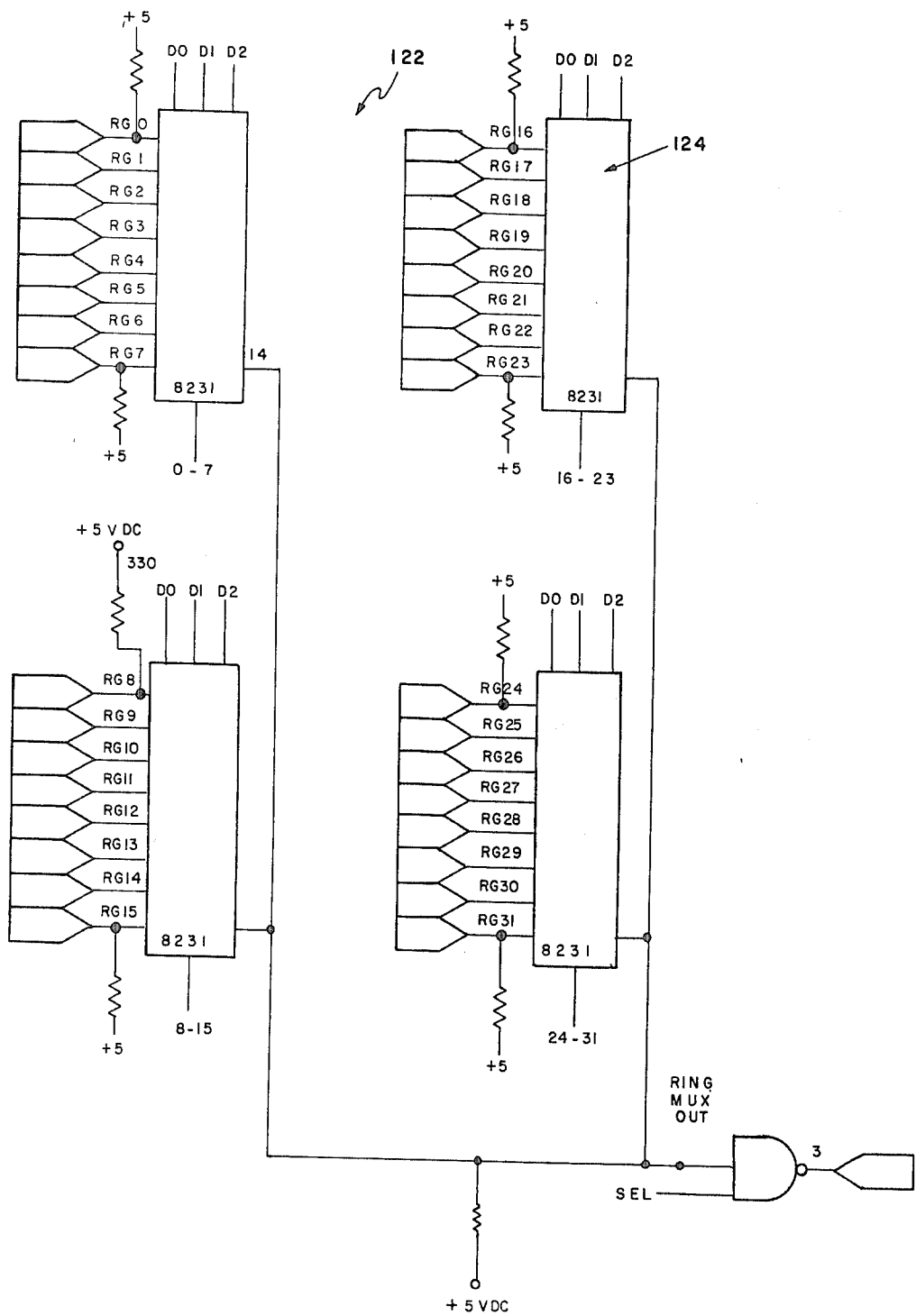
FIG. 11 is a schematic drawing of the ring multiplexer on the control card of FIG. 10.
Figure 12:
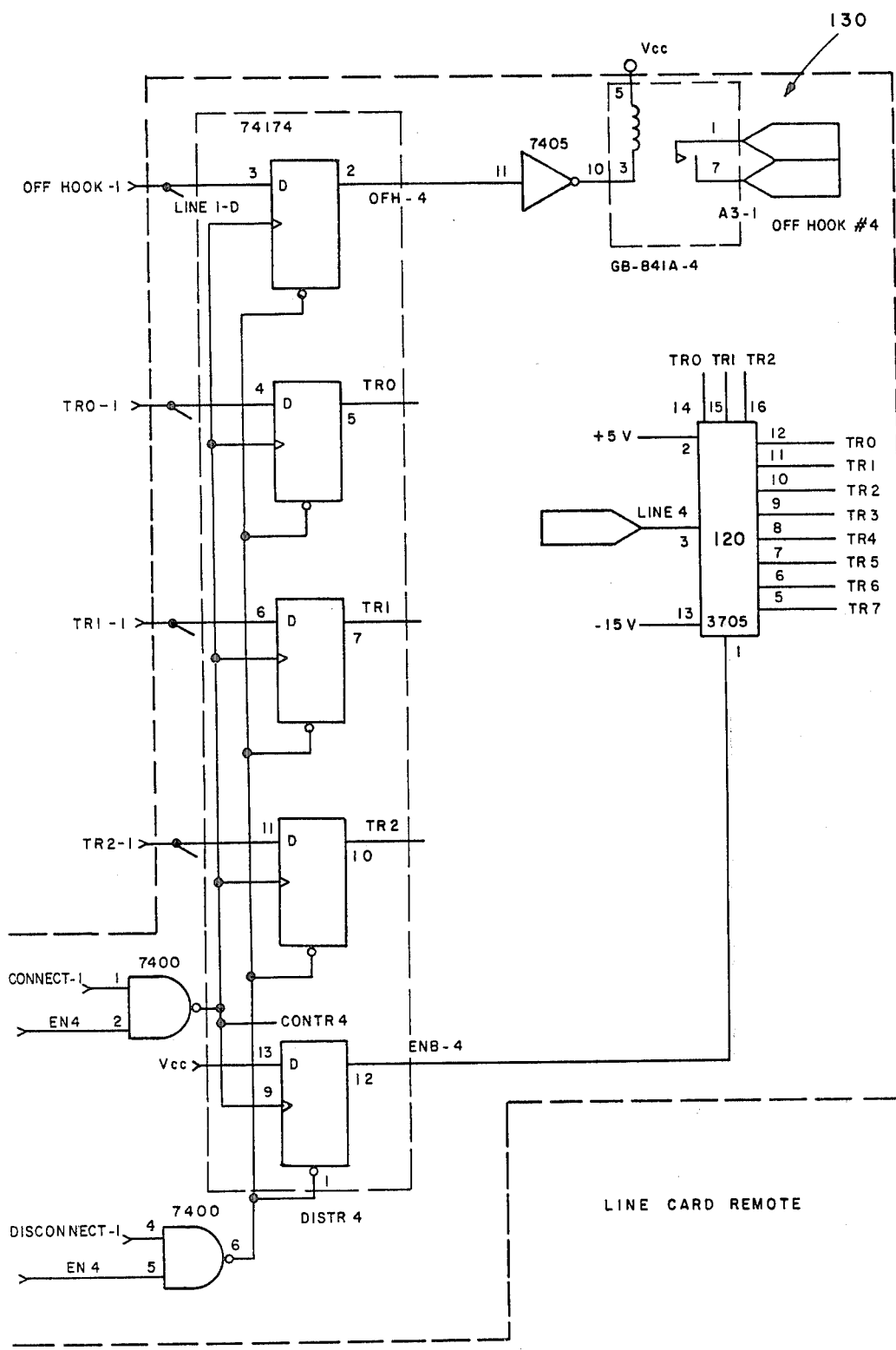
FIG. 12 is a schematic illustration of a line control card illustrating the input of one subscriber line to the 8-to-1 bidirectional analog switch as it appears on a line card in the remote concentrator, illustrated in FIG. 10.

FIGS. 10, 11 and 12 illustrate one of the remote line cards 90 used in the remote site concentrators. Each remote line card 90 has two primary functions. These are:

(a) To provide ring detection capabilities for monitoring the presence of incoming calls on each subscriber line 30 and (b) To provide the matrix address decoding necessary for accessing any of the 512 AM3705 analog multiplexers 120 described in FIG. 9.

The latter function of the remote line card 90 therefore allows the central site computer 44 to switch any one of the 512 incoming subscriber lines 30 to any one of the eight outgoing trunks via the remote line control card 90.

Each remote line card contains sufficient electronics for accessing any one of 32 AM3705 analog multiplexers 120 described in FIG. 9. Each 512×8 matrix 60, 62 of the type shown in FIG. 2, therefore, contains sixteen such remote line cards 90. FIG. 10 shows one such remote line card 90 minus the thirty-two analog multiplexers 120 and their associated electronics. FIG. 11 is a more detailed representation of the ring detect logic 122 shown also in FIG. 10. FIG. 12 shows one of the thirty-two analog multiplexers 120 and its associated electronics which are present on each remote site line card 90.

The function of the ring detect logic circuit 122 may be described as follows:

FIG. 2 shows that the telephone company's standard access device 46 (CD-6 or similar) delivers ring information to the remote site concentrator 32 of the telephone answering system 20. This information is in the form of a switch closure between ground and one of the RG leads shown in FIG. 11. That is to say, when a call to a subscriber is received at the telephone company a switch closure is implemented which shunts the appropriate RG lead to ground. There are, of course, 512 such leads; thirty-two to each of sixteen remote line cards 90. As shown in FIG. 11, the RG leads are inputs to an eight-to-one multiplexer 124. Any of the eight input lines may be connected to the output by applying the proper binary code, D0 D1 D2, and by enabling the multiplexer at pin 10. In this particular application the remote control card (not illustrated) imposes a ten bit binary code D0-D9 on the remote site line card 90. Bits D0-D2 are used in the ring detect to address one of eight input lines. Bits D3, D4 are sent through a two line to four line SN4155 decoder 126 (FIG. 10) to enable one of the four eight-line ring detect muxes. Bits D5-D9 are used to enable one of the sixteen remote line control cards by means of an enable signal (SEL) sent to the SN74155 decoder 126 and to the output gate of the ring mux circuit 122. Hence by sequencing bits D0-D9, each ring line from the 512 subscribers is checked for 0 volts. A ringing line will thereby be gated to the remote site control card so that the number of rings may be counted or so the termination of ringing may be reported. Any line not ringing will, of course, go unnoticed because each input is tied to five volts through a 330 ohm resistor.

In addition to controlling the address of lines to the ring detect multiplexer 122, bits D0-D9 are also imposed on four eight-bit Fairchild 9334 addressable latches 128 as shown in FIG. 10. Each of the thirty-two digital outputs from these latches is used to enable one of the thirty-two AM3705 eight channel analog multiplexers 120 via their associated circuitry. A discussion of the addressing circuits is given below.

FIG. 12 shows one of the thirty-two eight channel analog multiplex circuits 130 present on each remote line card 90. All inputs to this portion of the remote site line card are sent from the central site computer 44, through the remote site control card, and are imposed on the buffer gates shown in FIG. 10. A typical step-by-step sequence of events for a normal call routed through the telephone answering system 20 may be described as follows:

After the control unit 64 of the remote site concentrator 32 has determined that a subscriber line 30 has rung the number of times stored in ring memory, the remote site control unit 64 sends a digital message to the central site computer 44 to that effect. The computer 44 then determines a free path through the remote site concentrator 32, and sends an appropriate trunk addressing code on bits TR0-TR2. At the same time, a Connect bit is sent which clocks the trunk access bits into the D flip flops which have been properly enabled by the Fairchild 9334 eight bit latches 128. When the trunk address codes have been loaded a signal is sent to the central site computer 44 to that effect. The computer checks to see if the proper connection has been made, notifies one of the operators of an in-coming call, and displays the necessary information on her display 112. She presses an Off Hook button which is sent through the computer to the appropriate remote site line card 90 along with the trunk address code and the Connect signal. The connect signal again clocks all data into the D flip flops including the Off Hook data bit. The Off Hook relay is pulled in and the operator can then talk with the incoming caller. When the call is completed the operator sends a Disconnect signal through the computer to the remote site line card 90. This resets all the flip flops and disconnects the communications path through the analog mux. It is seen, then, that the ten data bits D0-D9 plus the trunk address codes determine exactly which analog multiplexer path is chosen.

The logic of the sixteen control cards in the remote site concentrator (thirty-two of such cards if two analog matrices 60, 62 are present) is not illustrated in detail because it is conventional solid state logic. This logic on the control card stores the number of rings required before a subscriber line 30 is answered; counts the number of rings on a ringing line and compares this number with the threshold stored. It also can receive and acknowledge eight basic digital messages:

Connect line x to trunk y;
take line x off-hook;
place line x on-hook and disconnect from trunk y;
deactivate all lines and trunks;
load ring count;
send ring count;
ring count compares;
ring count exceeds preset by two.

The central site concentrator 38 operates similarly to the remote site concentrator except for certain basic differences. Primary among these is the absence of any ring detection logic, ring count logic, off-hook and related digital messages. Hence the central concentrator needs to receive and acknowledge only three basic digital messages:
connect;
disconnect;
reset.

Thus central site concentrator is basically a large switching matrix, in the preferred embodiment a 128-to-64 switch, utilizing the same analog multiplexer 120 as a switch, as in the remote site concentrator 32.

As illustrated in FIGS. 10, 11 and 12, the concentrators 32, 38 operate on the principle of single wire switching. All the ring wires 50 are connected to a common ground which, in the remote site concentrator 32, serves in the ring detection logic 122. The tip wires 48 serve as inputs to the analog multiplexer switch 120. The high impedance of switch 120 enables an analog audio signal to pass in both directions over the single tip wire 48.

System Operation

System 20 is a telephone answering system having a number of subscribers 22 connected thereto. Each subscriber furnishes the system 20 with basic information such as the way he wishes his line answered, what type of messages to take, what questions to ask callers and after how many rings he desires to have the telephone answered. All this subscriber information is stored in central computer 44. Periodically central computer 44 will send digital messages to each remote site concentrator control unit 64 indicating predetermined number of rings for each subscriber line 24 connected to that concentrator 32. Control unit 64 constantly scans all subscriber lines 30 for a ringing condition. When a line 30 is detected as ringing, a ground appears at the ring detection multiplexer. At this point the ring is indicated to the remote site concentrator memory 64 which retrieves a word with answer instructions from its memory, increments a bit to count the rings, and compares the result to the predetermined number of rings required for answering the line. If the prescribed number of rings has not been met, no message is sent to the central computer and the control unit 64 goes on to scan the next line. If the threshhold of the predetermined number of rings has been met, then the remote concentrator control unit 64 outputs a control message over its control line to the central computer 44 stating that the ringing line has met the threshhold for being answered. Upon receipt of this message the central computer 44 does a table look-up to determine which trunk lines 34 are available to the central site concentrator 38 and which operator position 42 is available. The computer 44 then determines a path through both concentrators 32, 38 to an available operator position and communicates its switching instructions to each concentrator 32, 38 via the digital code discussed supra. While this is happening, central computer 44 also sends answering instructions to the operator position 42 which will answer the call. These instructions will appear on the operator's CRT 112 and will contain the subscriber's master record, answering instructions and a completion format. After the operator has reviewed this information, the operator signals the computer 44 that she is ready to accept the call by pressing a function key on her keyboard 110. At this point the computer 44 sets the off-hook indicator as described supra.

The operator then answers the call. The operator keys in any message, completes the call and signals the computer 44 that the call has been completed by hitting a function key on the keyboard 110. The message is first stored in the controller 114 until the computer 44 has time and channels available to request it. After being sent to the computer, the message is stored in disk memory.

If the call should be from a subscriber, either calling for his messages or to change his instructions, the operator first requests his identification number which she keys into the computer 44. Upon verification of identity the computer then sends the stored messages for the subscriber to the operator CRT 112 for display and reading to the subscriber, one at a time. After each message the operator indicates to the computer whether that message has been delivered to the subscriber. The computer 44 then marks the delivery record and creates a billing record.

If the subscriber desires to change his instructions, the computer 44 will output to CRT 112 the old instructions and a format for new instructions. The operator then fills out the format with the keyboard 110 and enters this data into the computer 44, which updates its files.

As illustrated in FIGS. 2 and 8, all the control functions are backed up by alternate equipment. All the computer programs have error checking routines. If control messages are not received by a given unit or are not acknowledged within a predetermined time limit, the message sequence is reinitiated. If there is a failure on the second try, the back-up equipment is switched in automatically.

Thus, it will be seen that the concentrators of the present invention provide a feasible and economical solution to the technical and cost problems involved in a large scale telephone answering service. The use of unmanned, remote trunk concentrators located adjacent to telephone company central offices provides a reduction of sixty-four to one in trunk line costs to a large centralized answering service. The use of a central concentrator provides a further cost reduction of two-to-one in operator labor and equipment costs for operator positions. The elimination of electromechanical switchboards and the use of computer-controlled electronic switching enabling any one of 8192 subscriber lines to be switched to any operator provides a flexibility not otherwise available. The use of single wire analog switching reduces the number of switches by one-half, providing a significant reduction in switching costs. With the multiplication of various units of equipment, the system of the present invention is capable of expansion to serve millions of subscribers over a wide geographic area at minimal costs.

It is to be understood that the above-described embodiments are but illustrative of the application of the principles of this invention. Numerous other arrangements and application may be devised by those skilled in the art without departing from the spirit and scope of the invention.

What is claimed is:

1. A digitally remote controlled trunk line concentrator for coupling incoming telephone circuit trunk lines to a lesser number of outgoing telephone circuit trunk lines comprising:
   (a) matrix switching means for interconnecting any one of said incoming trunk lines to any one of said outgoing trunk lines;
   (b) decoding means responsive to a digital command from a remote source to connect a particular incoming trunk line to a particular outgoing trunk line;
   (c) digital control circuit means in said matrix switching means responsive to said decoding means for causing said matrix switching means to connect said particular incoming trunk line to said particular outgoing trunk line, with one control circuit for each of the incoming trunk lines; and
   (d) a bidirectional analog multiplexer in the control circuit associated with each of the incoming trunk lines,
   (1) the tip wire of each incoming trunk line being connected to the input side of said analog multiplexer and the ring wire of each incoming trunk line being grounded, and
   (2) the tip wire of each outgoing trunk line being connected to the output side of said analog multiplexer,
   (3) said analog multiplexer thereby serving as a single wire analog switch for interconnecting an incoming trunk line to any outgoing trunk line.

2. A digitally controlled trunk line concentrator for coupling incoming subscriber telephone circuit trunk lines to a lesser number of outgoing telephone circuit trunk lines connected to an answering center comprising:
   (a) switching means for interconnecting any one of said subscriber trunk lines to any one of said outgoing trunk lines;
   (b) decoding means responsive to a digital command from said answering center to connect a particular subscriber trunk line to a particular outgoing trunk line;
   (c) digital control circuit means in said switching means responsive to said decoding means for causing said switching means to connect said particular subscriber trunk line to said particular outgoing trunk line, with one control circuit for each of the subscriber trunk lines;
   (d) testing means for repeatedly and sequentially testing each subscriber trunk line to ascertain whether it is in idle or ringing condition;
   (e) identity transmitting means responsive to said testing means for transmitting digitally to said answering center information concerning the identity of a subscriber trunk line to be answered; and
   (f) off-hook indication means for producing an off-hook indication on a subscriber trunk line when the control circuit of said subscriber trunk line is enabled.

* * * * *